May 5, 1959  R. KERKER ET AL  2,885,161
STABILITY CONTROL DEVICE FOR AIRCRAFT
Filed Aug. 11, 1948  2 Sheets-Sheet 1
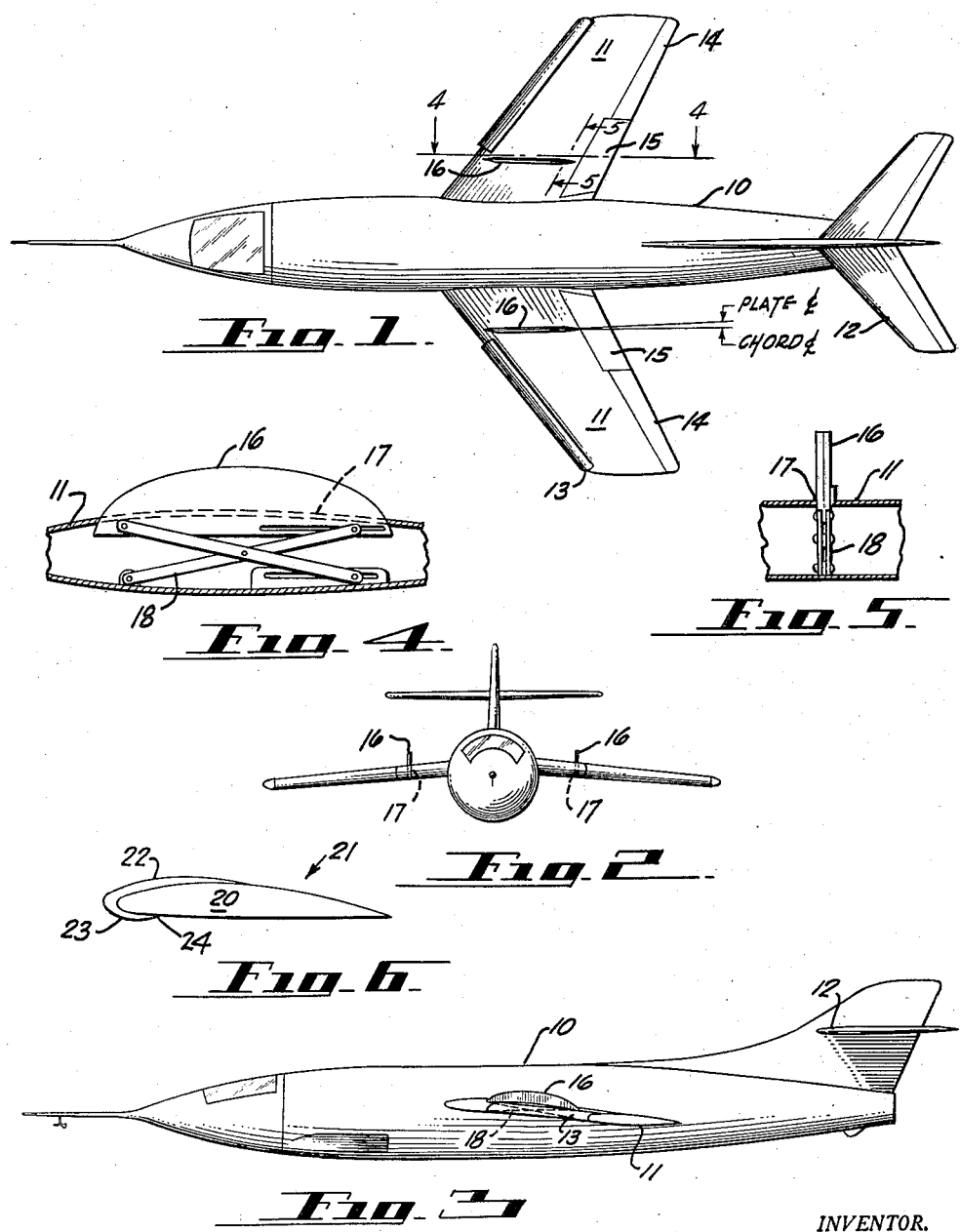
INVENTOR.
RICHARD KERKER AND
LINCOLN A. MARTIN
BY
J. Edwin Coates
ATTORNEY May 5, 1959 R. KERKER ET AL 2,885,161
STABILITY CONTROL DEVICE FOR AIRCRAFT
Filed Aug. 11, 1948 2 Sheets-Sheet 2

INVENTOR.
RICHARD KERKER AND
LINCOLN A. MARTIN
BY
Edwin Coates
ATTORNEY

2,885,161

STABILITY CONTROL DEVICE FOR AIRCRAFT

Richard Kerker, Gardena, Calif., and Lincoln A. Martin, Caracas, Venezuela, assignors to Douglas Aircraft Company, Inc., Santa Monica, Calif.

Application August 11, 1948, Serial No. 43,663

7 Claims. (Cl. 244—42)

This invention relates to airplanes, and especially to airplanes having wings incorporating a high degree of sweep-back, such as in the case in modern, ultra-high speed combat aircraft.

Inherently, such airplanes, particularly when not of the tailless, or "all-wing," type, are notoriously unstable longitudinally, especially at high angles of attack, such as prevail in landing or take off. This serious defect can be somewhat ameliorated by the employment of leading edge slats or slots, as is well known. However, the partial rectification of this deviation by these means introduces a still more serious disadvantage, in that such wings are apt to undergo an abrupt reversal in their stability curves several degrees before reaching the designed stalling angle.

This instability has been found by the present inventors to be the result in high attack-angle regimes of such wings, of the sudden formation on the upper surface of the wing, near the leading edge thereof, and adjacent the inboard end of the slat, if one is employed, of an extensive region or area in which the airstream departs entirely from contact with the wing. Instead, however, of remaining separated from the wing surface, as expectable, the airstream returns to the wing surface farther aft thereon, usually at a point located from 30% to 60% of the local chord length aft of the leading edge, the exact distance depending upon the angle of attack. This separated region, or "hump," in the air flow has an effect similar to that of a sudden local increase in the camber of the upper surface of the wing, resulting in an abrupt and undesirable increase in lift in this region.

This region, in such airplanes, is located inboard of the center of lift of the wing, for the reason that it is located inboard of the slat end, which slat preferably has a span extending inboard of the half-span point of the wing-half. In sweptback wings, further, this separation region is also located forward of the center of lift, because of the sweepback. Consequently, the effect of the sudden increase in lift in this region is to set up a strong positive pitching moment ahead of the center of lift.

As a corollary, the downward component of this returning airstream produces, behind the inboard wing areas, a downwash deflection which causes the downwash to be directed downwardly onto the horizontal surfaces of the tail. Consequently, the positive pitching moments already set up by the aforedescribed airstream "hump" on the wing are greatly augmented.

As the aforesaid separation and downward deflection increase with angle of attack and eventually become powerful enough to overcome the stabilizing effect of the tail, their net result is a positive pitching moment variation of sufficient magnitude to tend to automatically stall the airplane. On take-off and landing such stalling tendency may give rise to disastrous consequences.

The present invention resolves these difficulties and provides a high speed airplane of the type having wings bodily highly sweptback and, if desired, including leading-edge slats, which is longitudinally stable even in high angle of attack regimes.

To achieve this and other ends, the invention, broadly considered, provides an improved sweptback wing construction including novel aerodynamic means for longitudinally stabilizing such wings. The principal additional wing constructional element consists of an auxiliary aerodynamic instrumentality comprising a substantially vertical airfoil, functioning as an airflow dam and aerodynamic detent, that is, a suction drag and skin friction exerting boundary layer detaining or holding member, and as a deflector or baffle, and disposed airstreamwise on each wing half in the attack-angle and sweepback induced airstream separation region thereof located inboard of and ahead of the center of lift of the wing half. In one contemplated aircraft design employed when leading edge slats are provided, this instrumentality comprises a vertically extending airfoil which takes the general form of a plate-like member which may have any desired profile that is symmetrical longitudinally and vertically, the plate preferably having pointed leading and trailing edges. This member is disposed on the upper surface of each wing-half inboard of the inboard end of the slat and extends substantially in a low frontal drag, airstreamwise attitude at least from the forward edge of the separation region induced forward and inboard of the center of lift by the attack angle and sweepback, to the rearward edge of this region. Preferably, the plate is somewhat longer than this minimum permissible length, having a maximum longitudinal dimension somewhat less than that of the local chord of the fixed wing-portion that passes through the longitudinal center of the plate, the plate terminating forwardly adjacent to the inboard end of the slat and stopping short of the wing's leading edge, the rear terminal of the plate lying slightly forward of the trailing edge flap. The airstreamwise-extending plate also preferably lies medially of the lateral dimension of the separation region and thus its location, organization and vertical and longitudinal dimensions are, in any event, sufficient to trap the released boundary layer in the separation region and prevent its following its natural outward flowing tendency, by damming the inboard half thereof and deflecting it rearwardly, and skin frictionally holding the outboard half thereof and deflecting it also rearwardly. The separated layer is thus in its entirety directed rearwardly parallel to the wing surface. Thus, since the separated boundary layer does not now drain away outwardly, no vertical gap exists between the main airstream and the upper surface of the wing. Consequently, the main airstream, flowing rearwardly in contact with the upper surface of the rearwardly flowing boundary layer is maintained separate from the wing instead of returning thereto to form a "hump," or localized increase in effective camber and lift and forward shift of the center of lift. The device thus functions, flaps either up or down, to neutralize the pitching effects of sweptback wings.

In another of the presently contemplated embodiments of the invention, especially adapted for employment with thin, highly sweptback wings not provided with lift-intensifiers on their leading edges, the airfoil takes the form of a substantially vertically extending hook-like plate having its elongate portion, or "shank," mounted in substantially low frontal drag, airstreamwise attitude on the forward portion of the upper surface of each wing nearer the root than the tip of the wing. The "hooked" portion of this plate is mounted on the leading edge of the wing and its point is mounted on the forward portion of the lower surface of the wing, terminating, preferably, near the point of inflection of the lower curvature of the lift-section. The plate extends bafflewise across the path of the outward tending released boundary layer in the attack angle and sweepback induced airstream separation region lying forward of the center of lift of the wing, and arrests lateral movement of said layer and deflects same rearwardly so as to obviate the low-pressure region that tends to cause the separated airstream to deflect downwardly, thereby preventing the airstream from returning to the wing surface and forming a "hump."

In effect, therefore, the devices in either form, subtract from the positive pitching moments inherent in bodily highly swept back wings at high angles of attack, and thus maintains the airplane in a normal longitudinally stable condition.

The aforedescribed embodiments of the inventive concepts are illustrated, by way of example only, in the accompanying drawings and described hereinafter in conjunction therewith. It is to be definitely understood, however, that the invention is by no means limited in its constructional forms to the ones illustrated and described, being in fact and in law embodiable in any form within the scope of the annexed claims.

In said drawings:

Figure 2 is a front view of the same;

Figure 3 is a side elevation thereof;

Figure 4 is a section taken on line 4—4 of Figure 1, illustrating the retractive mounting of the stabilizing airfoils;

Figure 5 is a section taken on line 5—5 of Figure 1;

Figure 1:
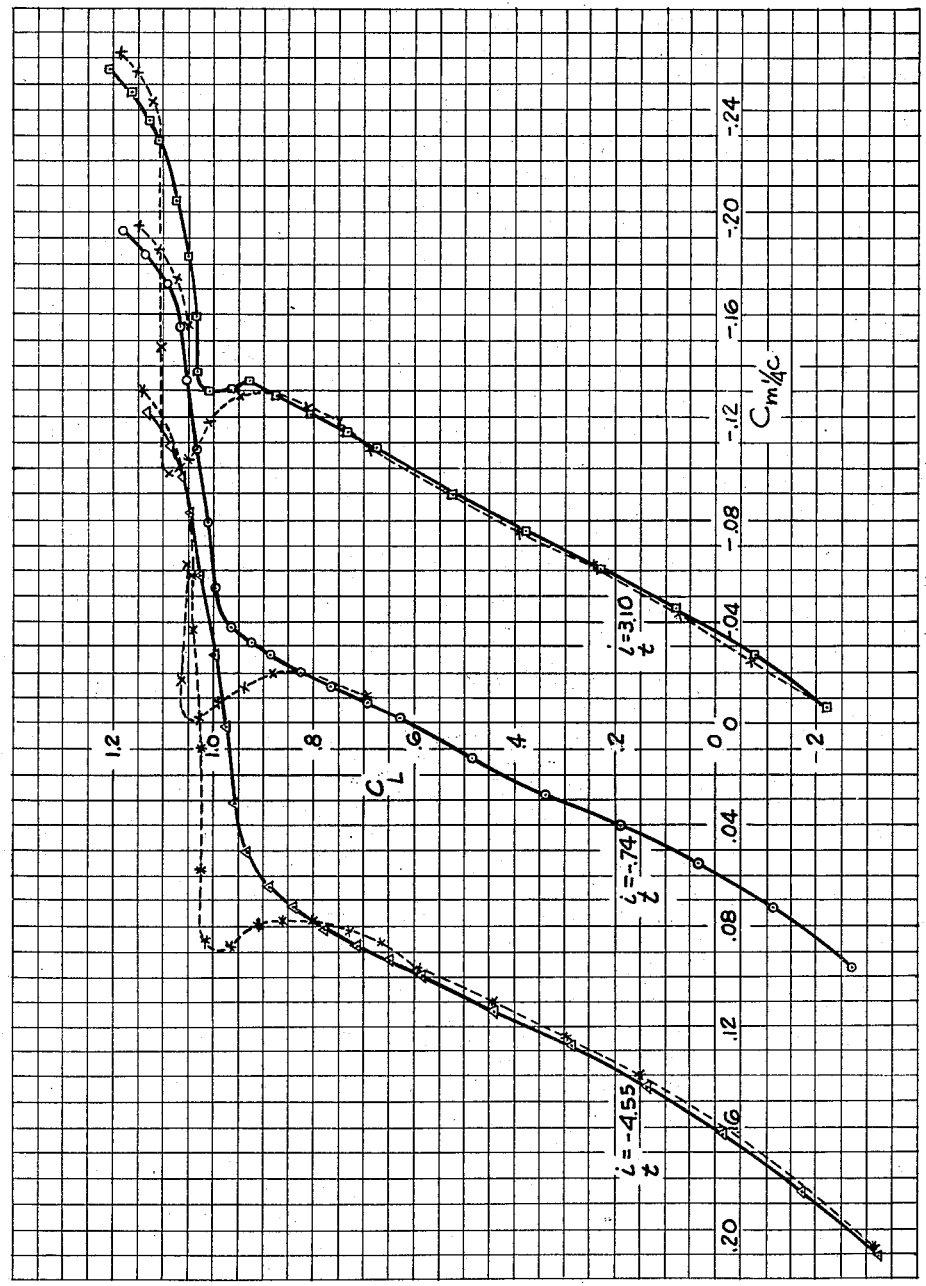
Figure 1 is a top plan view of a high speed airplane having entering edge wing slats and highly sweptback wings that embody one form of the invention.

Figure 6 is a chordwise section of a sweptback wing embodying another form of the invention; and Figure 7 is a graph comparing the longitudinal stability characteristics of a sweptback wing airplane provided with the present invention with those of a conventional sweptback wing airplane, with the flaps up and the slats open, the star and the cross curves representing the variation in pitching moments with increasing lift coefficients of a conventional airplane and the triangle, circle and square curves representing corresponding characteristics of the present airplane.

The invention is shown incorporated in an advanced high speed fighter which, by virtue of the employment of wings which are bodily sweptback to a high degree, and despite the utilization of lift intensifiers on the leading edge of the wings, is inherently unstable longitudinally.

The craft includes a fuselage 10 carrying monoplane wing-halves 11 mounted medially of the height of the fuselage in so-called "mid-wing" position and terminating rearwardly in an empennage, including horizontal surfaces 12. Each wing half also includes a Handley-Page type entering edge slat 13 defining a lift intensifying leading edge slot with the forward part of the wing. The slat may be either of the fixed type or of the chordwise movable type. In either case the invention contemplates that this slat be of considerably greater length than conventionally deemed necessary for its purpose, extending spanwise approximately 60% of the length of the entering edge of the wing, in the embodiment shown. However, the inventive concepts do not exclude slat lengths as short as 40 percent of the wing entering edge span or as long as 70% of that span. Each wing half also includes a conventional aileron 14 and a conventional flap 15.

Just inboard of the innermost end of each slat, a relatively thin elongate airfoil 16 is disposed airstreamwise on the upper surface of the wing half to extend vertically upwardly therefrom. The airfoil 16 extends airstreamwise of the wing and has a length somewhat less than that of the local chord, running, for example, from a point located 5.2% of the local chord rearwardly of the entering edge, to a point disposed 71.2% of the local chord back of the entering edge. It is shown as a lamella constructed with flat parallel sides and pointed entering and trailing edges.

If desired, as for example in the case of supersonic speed aircraft where attainment of minimum drag is of the essence, the airfoils 16 may be retractably mounted on the wing so that when not in use for conferring stability on landing, taking off or in other high attack angle regimes, they may be retracted vertically downwardly into the wing out of the airstream or folded laterally downwardly against the upper skin of the wing. One form of means for accomplishing the first mentioned retraction is diagrammatically illustrated as comprising slots 17 extending airstreamwise of the wing through the upper skin and extending vertically downwardly into the interior of the wing and having a depth and length sufficient to house and enclose the airfoils 16 inside the wing out of the airstream. The airfoils may be mounted on a pantographic linkage, or, if desired, a tong-like linkage 18, each link being pivotally attached at the one end to the lower edge of the airfoil and pivotally attached at the other end to a wall of the slot in the wing, or to spars or skin. Suitable operating linkage, not shown, may be employed for extending and retracting the fin-like plates 16, with one end of the operating linkage terminating in the pilot's cockpit, the other end, of course, being operatively connected to the pentographic linkage, as by means of gearing, not shown, but mutually interengaging the pantographic linkage and the operating mechanism.

Since in this location on highly sweptback wings, the airflow over the wing is not precisely parallel to the longitudinal axis of the craft, but instead is directed, from leading edge to trailing edge, angularly of the wing towards the fuselage, instead of flowing in congruency with the chord somewhat, it is also contemplated that the airfoils be disposed congruently with the direction of flow of the main airstream, or making a forwardly-opening acute angle, with the airplane's longitudinal center line, that is, that the forward or leading edge of each airfoil lies closer spanwise to the slot's inboard end than does the trailing edge thereof, so that it extends substantially parallel to the local airstream. Thus, at high speeds, if the airfoils 16 happen to be left exposed, their drag will be minimized. Preferably, though not necessarily, the upper edge of each airfoil has a parabolic or elliptical contour, and the maximum ordinate thereof lies near the half-chord point of the wing, thereby, among other things, to restrain the lateral movement of the boundary layer in that region of the upper surface of the wing where such tendency is greatest, namely, near the half-chord point of the wing.

These airfoils, being located where they substantially bisect the separation regions spanwise, dam the segment of the released boundary layer lying to the inboard thereof and thus positively prevent same from flowing outboard. They also serve to inhibit the draining outboard of a large part of the outboard segment of the boundary layer in this region, and, in addition to acting as a dam, hence also act as an aerodynamic detent. They also rectangularly deflect the boundary layer and cause it to flow downstream over the wing trailing edge, and reduce the tendency of the separated airstream to return to the wing surface. The airstreamwise directed airstream thus follows a smooth curve substantially parallel to the wing surface after separating from the wing surface, and flows past the wing in this path instead of curving abruptly downward to the wing surface, so that the effective camber of the wing remains normal. By virtue of this control of the flow-path of the separated airstream, the latter is maintained in such a path relative to the wing surface as to eliminate the downward component from the airstream, thus obviating downward deflection of the wing downwash and preventing it from impinging on the horizontal surfaces of the tail. Thus tail-originated automatic positive pitching moments are eliminated.

Figure 7 graphically illustrates this marked superiority at the critical values of the lift coefficient of the present airplane over those lacking the present improvements. In this figure the curves identified with the stars or asterisks and the crosses concern the conventional highly sweptback airplane with leading edge slats and represent the pitching moments at the quarter chord point plotted against lift coefficients, increasing with increased attack angles or lowered speeds. The curves designated by triangles, circles and squares represent the same functions of an airplane provided with the present invention, both airplanes having their flaps up and slats open; however, the invention has the same effect when the flaps are down. The symbol $i_t$ represents the angles of incidence of the horizontal stabilizer. The reversal in slope of the curves for the conventional airplane above a lift coefficient of approximately .8 indicate an unstable condition in which the airplane will tend to stall itself unless opposed by sudden manipulation of the controls. The triangle, and circle curves have a desirable shape in that the slope is constant up to the stall, at which point the curves break to the right. The reason for the slight reversal in slope of the square curve is that the size of the present airfoils had, in this instance, been purposely reduced to the point where they were just sufficient to provide stability at the stabilizer setting used in stalling or landing. If desired, this curve could easily be improved by a slight enlargement or shift in position of the airfoils. By this means, the stability of the airplane for any stabilizer setting may be corrected to the requisite degree.

The form of the invention illustrated in Figure 6 is particularly well suited for use with highly sweptback wings having a relatively thin lift-section and lacking leading edge slats or other lift-intensifying means forward of its center of lift.

As shown, this embodiment comprises a wing 20 supporting a vertically extending airfoil 21 mounted on the surface of each wing at a spanwise location lying about one-third the wing span outwardly from the longitudinal center line of the airplane, this distance, of course, varying somewhat with various specific designs of the airplane. However, regardless of the specific design, the airfoil 21 is disposed substantially in an airstreamwise attitude in that location on the wing where, because of the thinness of the wing section, and on account of the sweepback and the relatively high angle of attack, the airstream separates, in a region lying inboard of the center of lift, from the forward portion of the upper surface of the wing, from the leading edge thereof, and from the forward portion of the lower surface of the wing. The airfoil extends from the forward edge of this separation region to the rearward edge thereof and preferably laterally medially of this area, and has vertical dimensions sufficient to trap the released, and now outward-tending, boundary layer. In the embodiment of the airfoil contemplated for thin-section, highly sweptback supersonic combat airplanes, the device takes the form of a hook-like plate having its upper elongate portion, or shank 22, mounted in substantially low frontal drag, fore-and-aft attitude on the forward portion of the upper surface of the wing, the central portion 23 of the plate being mounted on the entering edge of the wing, and the rearmost point 24 of the lower portion thereof being mounted on the forward portion of the lower surface of the wing. The inboard portion of the boundary layer is thereby dammed from lateral flow and the outboard portion is frictionally engaged and lateral flow thereof is restrained, by the airfoil 21, both layer portions being directed rearwardly underneath the superimposed, rearwardly flowing main airstream, and flows past the wing in this path. There is, hence, contrary to the usual occurrence, no "vacuum" or low pressure region created underneath the separated airstream and thus the airstream has no tendency to return towards the wing or establish a "hump." Consequently, there is no local increase in effective camber, and hence no automatic positive pitching moments are created ahead of the center of lift, and the normal longitudinal stability of the craft is preserved. If desired, retractive and protractive mounting means, similar to those employed for the first mentioned embodiment, may be provided for supporting the aforedescribed embodiment.

We claim:

1. A longitudinally stabilized airplane having sweptback wings undergoing airstream separation upon landing and takeoff in a region lying inboard, and ahead of the wing's center of lift, comprising: a fuselage rearwardly supporting an empennage, equal-span wing portions extending laterally from opposite sides of said fuselage and bodily angling rearwardly equally and acutely therefrom; and a substantially vertical aerodynamic deflector-and-detent member disposed generally fore and aft on the surface of each swept-back wing portion in the airstream separation region that is attack-angle induced on that surface near the root thereof and ahead, and inboard, of the center of lift of each wing portion at attack angles greater than zero; whereby to prevent local virtual camber increase of said sweptback wing portion sufficiently to longitudinally stabilize the airplane.

2. A longitudinally stabilized airplane having sweptback wings undergoing airstream separation upon landing and takeoff in a region lying inboard, and ahead, of the wing's center of lift, comprising: a fuselage rearwardly supporting an empennage, equal-span wing portions extending laterally from opposite sides of said fuselage and bodily angling rearwardly equally and acutely therefrom; and a rectilinear, parallel-sided, relatively thin, substantially vertical lamella disposed on the flow-line of the sweep-back-directed, inwardly flowing airstream with its longitudinal center line angling outwardly from the airplane's center line and the lamella lying entirely within the airstream separation region that is induced at angles of attack greater than zero on the upper surface of each swept-back wing portion near the root thereof and ahead, and inboard, of the center of lift of each wing portion; the inner face of said lamella being substantially coextensive with the chordwise extent of said separation region and lying substantially perpendicular to the upper surface of the wing, said inner face having a height at least equalling the thickness of the adjacent portion of the wing's boundary layer in the aforesaid separation region, thereby to prevent lateral outward movement of that portion of the boundary layer that is released by the attack-angle induced main airstream separation on said wing portions; whereby to direct said layer rearwardly on the wing and maintain the main airstream substantially conformed to the contour of said wing so as to prevent local virtual camber increase of said swept-back wing portion sufficiently to longitudinally stabilize the airplane.

3. A longitudinally stabilized airplane having a sweptback wing undergoing airstream separation upon landing and takeoff in a region lying inboard, and ahead, of the center of lift of the wing, comprising: a fuselage rearwardly supporting an empennage; equal-span wing portions extending laterally from opposite sides of said fuselage and bodily angling rearwardly equally and acutely therefrom; and a substantially vertical airfoil member disposed generally fore and aft in the airstream separation region induced on the upper surface of each wing portion upon takeoff and landing and having an inner face arranged within said separation region and said inner face having a smooth, planeal shape substantially coextensive with the chordwise extent of said separation region and said inner face lying substantially perpendicular to the upper surface of the wing and having a height at least equalling the thickness of the inboard portion of the wing's boundary layer in the aforesaid separation region, thereby to enable the inner face of said airfoil member to laterally dam and rearwardly and inwardly deflect the major portion of the boundary layer released under the separated airstream and having an opposite face arranged within said separation region and said outer face having a smooth planeal shape substantially coextensive with the remaining portion of said released boundary layer and said outer face lying substantially perpendicularly to the adjacent upper surface of the wing and having a height at least equalling the thickness of the outboard portion of the boundary layer in the aforesaid separation region, thereby to enable the outer face of said airfoil member to set up skin friction and drag thereon sufficient to temporarily retain the latter portion and constrain it from lateral outward movement; whereby to prevent lateral outward movement of that portion of the boundary layer that is released by attack-angle induced main airstream separation on said wing-portions thereby to direct said layer rearwardly on the wing and maintain the main airstream substantially conformed to the contour of the wing so as to prevent local virtual camber increase of said swept-back wing portions sufficiently to longitudinally stabilize the airplane.

4. A longitudinally stabilized airplane having sweptback wings undergoing airstream separation at landing and takeoff in a region lying ahead, and inboard, of the center of lift ordinarily effective to longitudinally destabilize the airplane, comprising: a fuselage rearwardly supporting an empennage; equal-span wing portions extending laterally from opposite sides of the fuselage and bodily angling rearwardly equally and acutely therefrom; and a substantially vertical, boundary layer dividing, damming, deflecting, and constraining lamella disposed generally fore and aft on that surface of each sweptback wing portion on which the airstream undergoes separation from the surface and lying wholly within such separation region and extending fore and aft at least throughout said region and extending vertically at least the full depth of the boundary layer and having an inner face that is smooth and planeal and substantially coextensive with the chordwise extent of said separation region and said inner face lying substantially perpendicular to the upper surface of the wing and having a height at least equalling the thickness of the inboard portion of the boundary layer in the aforesaid separation region, thereby to enable said lamella to positively and directly deflect inwardly and rearwardly the major portion of the boundary layer released under the separated airstream for the full chord extent of the near root portion of the swept-back wing portion and having its opposite face smooth and planeal and substantially coextensive with the chordwise extent of said separation region and said outer face lying substantially perpendicular to the adjacent upper surface of the wing and having a height at least equalling the thickness of the outboard portion of the boundary layer in the aforesaid separation region, thereby to enable said outer face to apply drag and skin friction to the remaining portion of the released boundary layer sufficient to restrain lateral outward movement of the latter portion and to thereby enable the airstream to blast said portion rearwardly on said surface, thereby to maintain the main airstream substantially conformed to the contour of the wing; whereby to prevent local virtual camber increase of said sweptback wing sufficiently to longitudinally stabilize the airplane.

5. A relatively high-lift, longitudinally stable airplane having a wing which is relatively thin and is swept back, comprising: a fuselage rearwardly supporting an empennage; equal-span wing portions extending laterally from opposite sides of the fuselage and bodily angling rearwardly equally and acutely therefrom and including an airstream contacted area on the upper surface thereof near the root and forward and inboard of the center of lift thereof from which the airstream separates at attack angles greater than zero; a laminar flow effecting, lift intensifying slat spaced forwardly from the leading edge of each wing portion outboard of said area and having a terminal tending to intensify said separation; and a substantially vertical airfoil disposed on the upper surface of each of said wing portions in said separation region and near the inboard terminal of said lift intensifying means; whereby to longitudinally stabilize the airplane.

6. A longitudinally stable, swept-back wing airplane undergoing airstream separation, upon landing and takeoff, in a region lying ahead and inboard of the wing's center of lift, comprising: a fuselage rearwardly supporting an empennage; equal-span wing portions extending laterally outwardly from opposite sides thereof and bodily angling rearwardly equally and acutely therefrom; and a substantially vertical bifurcated plate of rearwardly concave rearward contour and forwardly convex forward contour mounted with its longitudinal center line making, from front to rear thereof, an outwardly acute angle with the longitudinal center line of the airplane and lying substantially in airstreamwise, low frontal drag attitude on the forward portion of each sweptback wing portion in the airstream separation region induced near the root of said wing portion and forward, and inboard, of the center of lift of each wing portion by attack angles appreciably greater than zero at least the upper bifurcation of said plate being chordwise coextensive with the attack-angle induced airstream separation region on the upper surface of the sweptback wing; whereby to obviate local virtual camber increase on said wing in said angles of attack thereby to longitudinally stabilize the airplane.

7. A longitudinally stable, swept-back wing airplane undergoing airstream separation, upon landing and takeoff, in a region lying ahead and inboard of the wing's center of lift, comprising: a fuselage rearwardly supporting an empennage; equal-span wing portions extending laterally outwardly from opposite sides thereof and bodily angling rearwardly equally and acutely therefrom; and a substantially vertical longitudinally hooked-shaped plate having the concavity of the hook disposed rearwardly and having an upper shank portion, a central forward portion and a lower shank portion, said plate being mounted with its longitudinal center line making, from front to rear thereof, an outwardly acute angle with the longitudinal center line of the airplane and lying substantially in airstreamwise, low frontal drag attitude on the forward portion of each swept-back wing portion in the airstream separation region induced near the root of said wing portion forwardly, and inboardly, of the center of lift of each wing portion by attack angles greater than zero, with its upper shank portion extending rearwardly at least coextensively with said separation region and extending rearwardly farther than its lower shank portion thereby to differentially dam laterally-outward boundary layer flow in the respective separation regions on the upper and on the lower surfaces of said wing portion; whereby to obviate local virtual camber increase in said angles of attack and longitudinally stabilize the airplane.

References Cited in the file of this patent
UNITED STATES PATENTS

| 1,495,031 | Muzik | May 20, 1924 |
| 1,724,110 | Reid | Aug. 13, 1929 |
| 2,120,760 | Lumiere | June 14, 1938 |
| 2,368,205 | Diehl | Jan. 30, 1945 |

OTHER REFERENCES

"Jane's All the World's Aircraft," 1949–1950, pages 264c–265c.

"Aviation Week," vol. 54, Number 7, Feb. 12, 1951 (front cover).